United States Patent
Karam et al.

(10) Patent No.: US 10,037,596 B2
(45) Date of Patent: Jul. 31, 2018

(54) IN-VEHICLE OPTICAL IMAGE STABILIZATION (OIS)

(71) Applicants: Raymond Miller Karam, Santa Barbara, CA (US); Oleg Obyedkov, Goleta, CA (US)

(72) Inventors: Raymond Miller Karam, Santa Barbara, CA (US); Oleg Obyedkov, Goleta, CA (US)

( * ) Notice: Subject to any disclaimer, the term of this patent is extended or adjusted under 35 U.S.C. 154(b) by 0 days.

(21) Appl. No.: 14/932,980

(22) Filed: Nov. 5, 2015

(65) Prior Publication Data
US 2016/0134799 A1   May 12, 2016

Related U.S. Application Data

(60) Provisional application No. 62/078,373, filed on Nov. 11, 2014.

(51) Int. Cl.
    *H04N 5/232* (2006.01)
    *G06T 5/00* (2006.01)

(52) U.S. Cl.
    CPC ........... *G06T 5/00* (2013.01); *H04N 5/23283* (2013.01)

(58) Field of Classification Search
    CPC .............................. H04N 5/2328; G06T 5/00
    USPC ............................................. 348/118, 208.7
    See application file for complete search history.

(56) References Cited

U.S. PATENT DOCUMENTS

| | | | |
|---|---|---|---|
| 2005/0259888 A1* | 11/2005 | Ozluturk | H04N 5/23248 382/260 |
| 2007/0092244 A1* | 4/2007 | Pertsel | H04N 5/23248 396/153 |
| 2007/0093945 A1* | 4/2007 | Grzywna | G05D 1/101 701/23 |
| 2007/0115349 A1* | 5/2007 | Currivan | H04N 7/141 348/14.08 |
| 2008/0054158 A1* | 3/2008 | Ariyur | G01S 3/7864 250/203.1 |
| 2009/0219224 A1* | 9/2009 | Elg | G06F 3/012 345/8 |
| 2011/0063458 A1* | 3/2011 | Washisu | G03B 5/00 348/208.2 |
| 2011/0181601 A1* | 7/2011 | Mumbauer | G06F 3/011 345/473 |
| 2013/0157718 A1* | 6/2013 | Johanson | H04M 1/66 455/556.1 |
| 2014/0300706 A1* | 10/2014 | Song | H04N 13/0246 348/49 |

(Continued)

*Primary Examiner* — Antoinette Spinks
(74) *Attorney, Agent, or Firm* — Shalini Venkatesh

(57) ABSTRACT

Embodiments generally relate to systems and methods for in-vehicle optical image stabilization. In one embodiment, the system includes a first motion sensor rigidly attached to a video capture device mounted in a vehicle; a second motion sensor rigidly attached to an object in the vehicle, the object being within the field of view of the video capture device; and a controller. The controller is operatively connected to the first motion sensor, to the second motion sensor, and to a movable optical element in the video capture device. In one aspect, the first sensor provides a first output signal to the controller, the second sensor provides a second output signal to the controller; and the controller provides a compensation signal to the movable element determined by the first and second output signals.

22 Claims, 4 Drawing Sheets

(56) References Cited

U.S. PATENT DOCUMENTS

| | | | | |
|---|---|---|---|---|
| 2014/0355141 A1* | 12/2014 | Kadowaki | ............... | G02B 7/023 |
| | | | | 359/823 |
| 2015/0130954 A1* | 5/2015 | Hyun | ................. | H04N 5/23267 |
| | | | | 348/208.2 |
| 2015/0319365 A1* | 11/2015 | Lloyd | ................ | H04N 5/23287 |
| | | | | 348/208.11 |

* cited by examiner

IN-VEHICLE OPTICAL IMAGE STABILIZATION (OIS)

RELATED APPLICATIONS

This application claims priority from U.S. Provisional Patent Application Ser. No. 62/078,373, entitled "In-vehicle optical image stabilization", filed on Nov. 11, 2014, which is hereby incorporated by reference as if set forth in full in this application for all purposes.

BACKGROUND

The current state of the art for optical image stabilization involves interpreting a signal on one frame of reference (the camera) relative to another frame of reference (the image being captured) and applying compensating motions (horizontal/vertical translations, or tilting) to the optical elements to counter relative motions between the camera frame of reference and the image being captured. This is generally accomplished using an angular velocity or gyroscopic sensor rigidly mounted to the camera, which provides a signal indicative of rotation of the camera frame of reference. Various algorithms carrying out processes such as integration and scaling are applied to the gyroscope signal. The result yields the direction and magnitude response signal which is applied to the active elements of the camera (motor, piezo, piston, etc.) to move the optical elements of the camera. The current state of the art devices commonly use a voice coil motor to move the optical elements. An optical element is rotated or translated based on the response signal, with the intention of counteracting the motions of the camera relative to the image such that the image remains fixed on the camera sensor during the exposure duration.

Some OIS methods use single or multi-axis gyroscopes mounted to the camera system, in the camera sensor frame of reference, with the aim of compensating for hand-shake or tremor on the part of the camera user. Such methods are generally sufficient for stabilizing images where the image itself is stationary or inherently stable. However, if the image is itself subject to motion, these methods are inadequate. Another disadvantage of current OIS methods is saturation, which can occur for motions of greater magnitude and frequency, for example those encountered in moving vehicles as opposed to in relatively static situations.

Another distinct category of methods in the prior art for image stabilization is electronic image stabilization (EIS) or digital/software based compensation, although it is important to note that these techniques are not truly "optical" image stabilization. These methods use software algorithms to post process a previously captured image or video. Since software based methods do not move any of the optical elements, they cannot correct image blur caused by motion across pixels of the sensor during the exposure and are thus inferior to true optical image stabilization.

The need therefore remains for methods and systems for true optical image stabilization that can compensate adequately for motions in situations where both the camera and the image may have independent motions, thereby causing image blur. Such methods and systems would be particularly desirable for stabilizing video for in-vehicle video conferencing, especially if they can encompass large and high frequency motions.

SUMMARY

The present invention includes a system for in-vehicle optical image stabilization. The system comprises a first sensor rigidly attached to a video capture device mounted in a vehicle; =a second sensor rigidly attached to an object in the vehicle, the object being within the field of view of the video capture device; and a controller/ The controller is operatively connected to the first sensor, to the second sensor, and to a movable optical element in the video capture device.

In one aspect, the first sensor provides a first output signal to the controller, the second sensor provides a second output signal to the controller; and the controller provides a compensation signal to the movable element determined by the first and second output signals.

In one aspect, a method in-vehicle optical image stabilization comprises receiving a first signal from a first sensor rigidly attached to a video capture device mounted in a vehicle; receiving a second signal from a second sensor rigidly attached to an object in the vehicle, the object being within the field of view of the video capture device; and processing the first and second signals to provide a compensation signal to a movable element in the video capture device.

DETAILED DESCRIPTION

In the context of this disclosure, image stabilization refers to changing or moving a physical optical element with the intention of keeping the image stationary on the camera sensor during the exposure duration of the image. If the image is moving across several pixels of the sensor during exposure, it will appear blurry. Hence, the OIS aims to keep the image stationary on the sensor during the period of exposure to within as few pixels as possible (preferably 1 pixel). The image may be one frame or more of a video sequence of images captured by the camera sensor The manner in which the present invention provides its advantages can be more easily understood with reference to FIGS. 1 through 4.

Figure 1:
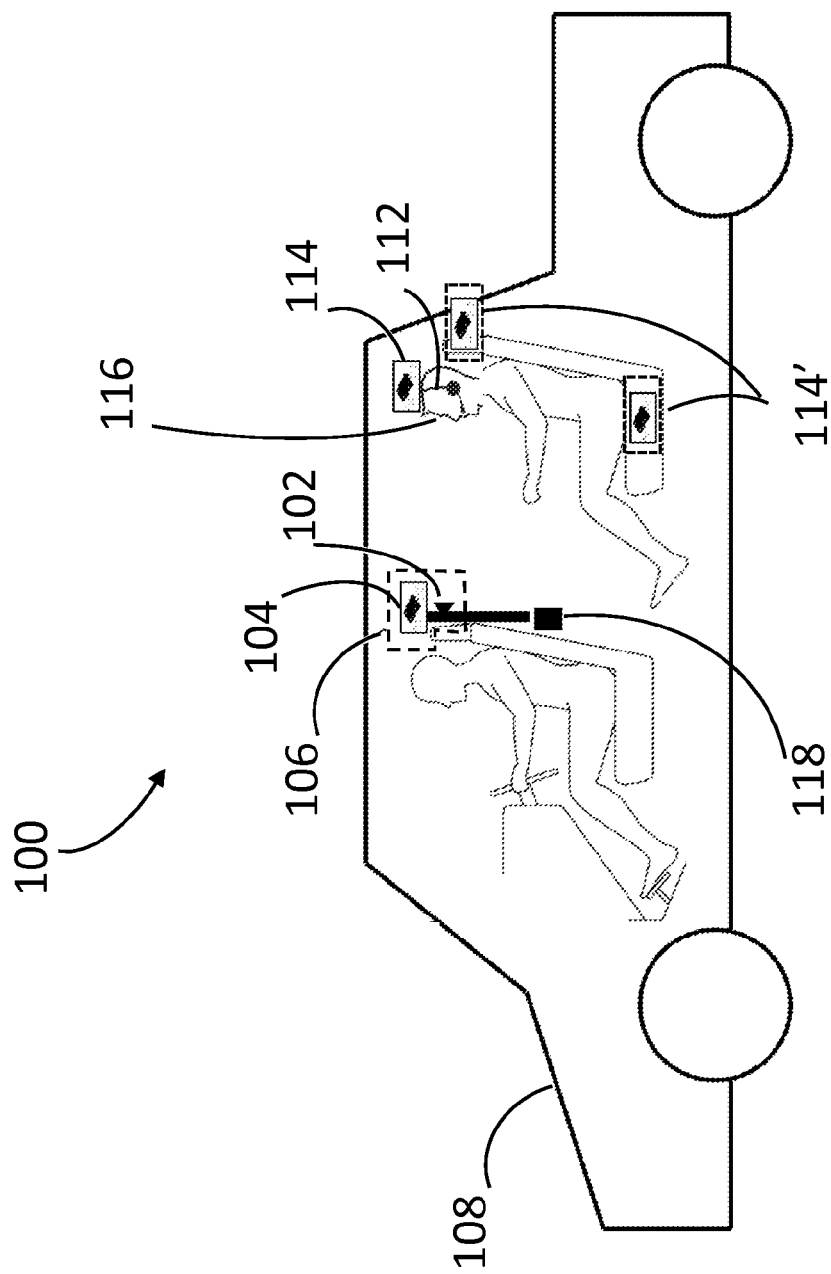
FIG. 1 illustrates a system for in-vehicle optical image stabilization according to one embodiment.

FIG. 1 illustrates one embodiment of a system 100 carrying out the present invention. Camera sensor 102 and first motion sensor 104 are rigidly integrated into a video capture device (camera module) 106 integrated into a rear seat of a vehicle 108. In other embodiments, camera sensor 102 and first motion sensor 104 may be rigidly integrated into the dashboard of vehicle 108. The video capture device 106 may have a tablet form factor, which can include a video screen as well as the camera and it may be removable from the vehicle. System 100 also includes a headset or earpiece (earphones and/or microphone) 112 into which a second motion sensor 114 is rigidly integrated. In another embodiment the second motion sensor 114 may be integrated into some other form of wearable electronic device, such as glasses or a pin or clip or necklace. In many embodiments, the second motion sensor is preferably positioned to be near the upper torso or head/face area of user 116. In some embodiments, the second motion sensor may be located in a passenger front or rear seat or seat headrest rather than on the user, as indicated in the figure by the dashed boxes 114'. Also, there may be one or more additional motion sensors (third, fourth etc), one for each of multiple users of single system 100.

Output signals from motion sensors 104 and 114 are sent to a microcontroller or processor 118 in real time (typically less than 1 ms) and are interpreted and analyzed therein. Microcontroller or processor 118 may be integrated with or located close to video capture device 106, as shown in the figure. The signals are preferably sent wirelessly, for example via a Bluetooth connection, but may also be sent over a wired serial interface, i.e. I²C or CANBUS. Taken together, the two motion sensors' output signals are used to calculate the relative motion between the camera module 106 and user 116, to provide an output compensation signal. In some embodiment, the motion sensors' output signals are used in an algorithm that integrates and scales each of them, and yields the difference between them, modified by a scaling factor or trigonometric relation, as the output compensation signal.

In all cases, the output compensation signal generated by microcontroller or processor 118 is used to actuate one or more optical elements of camera module 106 in a manner that counteracts the relative motion between camera module 106 and user 116, thereby stabilizing the image captured by camera sensor 102 in camera module 106 in real time.

The optical elements within camera module 106 can be translated and/or rotated actively using any method. In some embodiments, the optical element that is activated is a liquid lens, and the two sensor output signals are processed and used to calculate the tilt of the liquid lens required to stabilize the image on the camera sensor. The tilt is described by the tilt orientation or azimuth and magnitude, and an algorithm, such as the one discussed above, may calculate the appropriate voltages to be applied to the lens electrodes to achieve the proper tilt configuration.

A liquid lens is just one example of a motion-compensating movable element. Other examples of such tracking elements include voice coils and piezoelectric elements.

In some embodiments of the present invention, one or both of the first and second motion sensors comprises a gyroscope sensor, an accelerometer and/or a velocimeter.

In some embodiments of the present invention, second motion sensor 114 in the user's reference frame may comprise an accelerometer while first motion sensor 104 comprises a gyroscope sensor. Integration of the accelerometer's output signal would result in a linear displacement signal, as compared to a rotation-indicating output signal from a gyroscope. Data indicative of displacements derived from accelerometer sensor 114 can be combined with data indicative of rotation derived from gyroscope sensor 104 on the camera module to calculate the direction and magnitude to actively move the optical components to stabilize the image.

An additional feature of some embodiments of the present invention is an algorithm that accommodates turning and braking/acceleration events. The current state of the art OIS methods are designed to negate hand shake by the user holding the camera, and hence accommodate small amplitude movements at low frequencies. In a vehicle, navigating a turn may saturate the gyroscope signal and defeat the OIS capability of the system. In the system described here, the computer or microcontroller will detect the vehicle turning and the corresponding pending saturation of the gyroscope output signal, and provide signals that compensate for the turn and avoid saturation. In one embodiment the system may use signals from a separate sensor (not shown in the figure) in the vehicle to monitor vehicle status, in terms of parameters such as vehicle speed and steering wheel position. A first turn compensation method is to filter out the turning rotation (i.e. ignore very low frequency signal content). A second turn compensation method is to have the OIS system enter a routine where the reference position is updated while the active optical components are gradually shifted back to the center of the range of motion.

Figure 2:
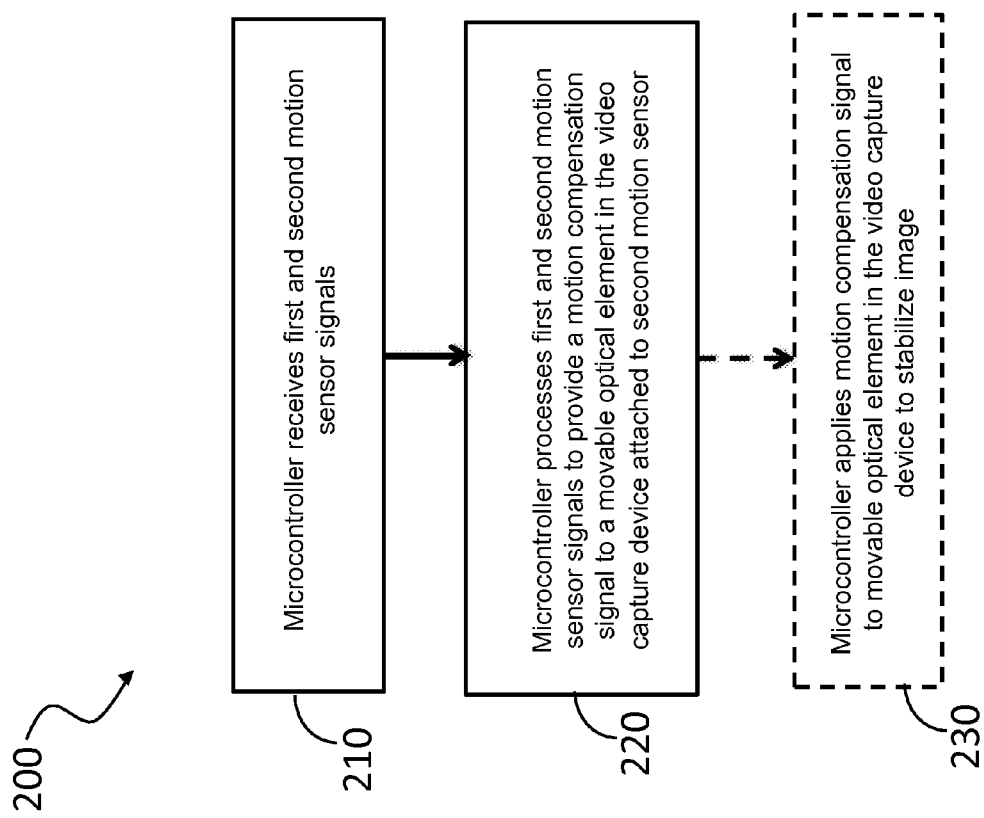
FIG. 2 is a flowchart of a method for in-vehicle optical image stabilization according to one embodiment.

FIG. 2 is a flowchart illustrating one embodiment of a method 200 for carrying out the present invention. At step 210, a microcontroller or processor receives first and second signals, the first signal coming from a first motion sensor rigidly attached to a video capture device mounted in a vehicle, and the second signal coming from a second motion sensor rigidly attached to an object in the vehicle, the object being within the field of view of the video capture device. At step 220, the first and second signals are processed to provide a motion compensation signal to a movable element in the video capture device.

In one embodiment of the present invention, steps 210 and 220 are followed by step 230, shown in the dashed box in FIG. 2, in which the motion compensation signal is applied to the movable element within the video capture device such that the image captured by the device is stabilized with respect to the image sensor within the device.

Figure 3:
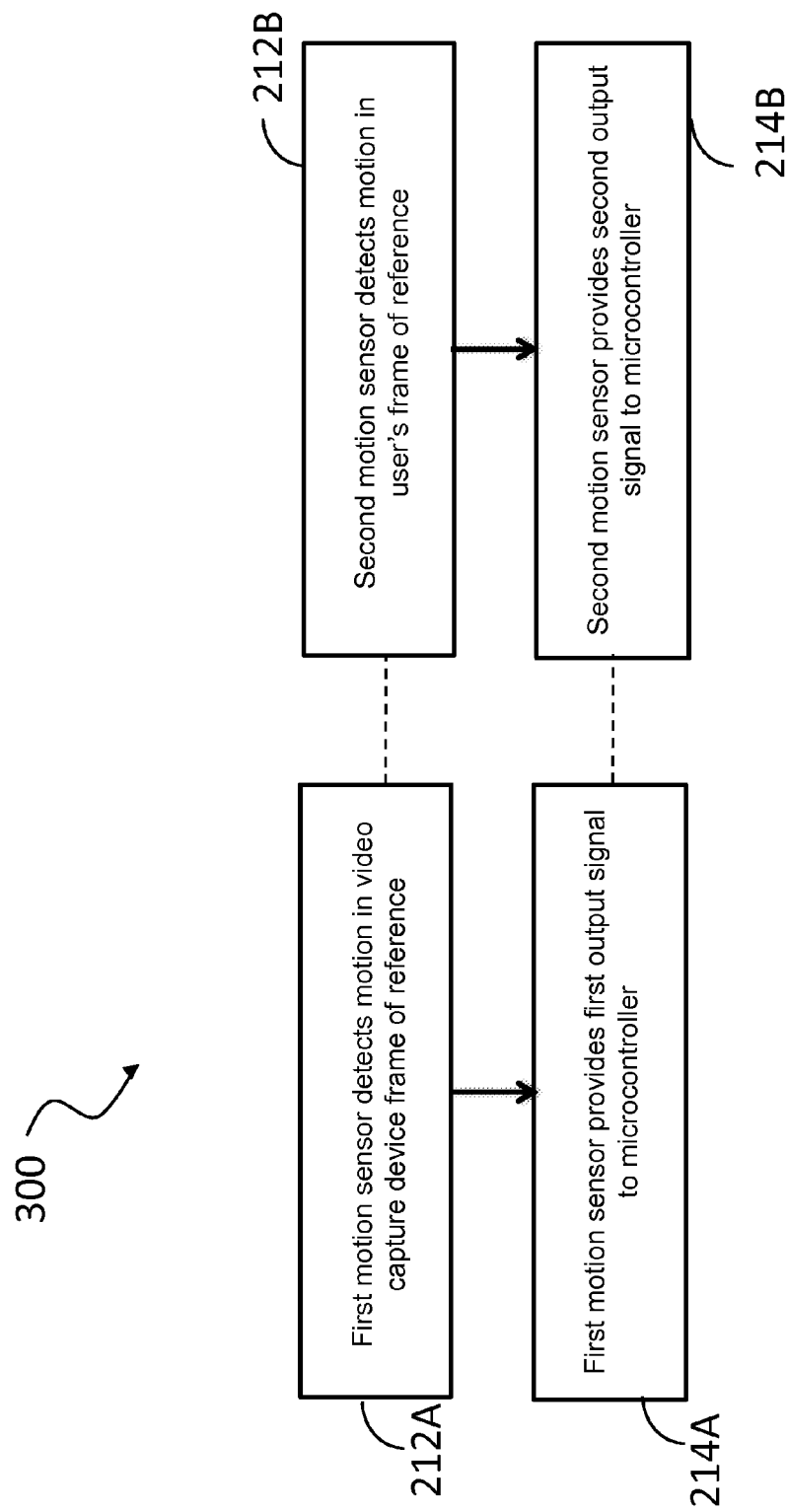
FIG. 3 illustrates sub-steps of a method for in-vehicle optical image stabilization according to one embodiment.

In one embodiment of the present invention, step 210 can be broken down into sub-steps as shown in FIG. 3. At sub-step 212A, a first motion sensor rigidly attached to a video capture device mounted in a vehicle detects motion in the device's frame of reference. At sub-step 212B, carried out substantially simultaneously with sub-step 212A, as indicated by the upper horizontal dashed line, a second motion sensor rigidly attached to an object in close proximity to a user in the vehicle detects motion of the user in the user's frame of reference. At sub-step 214A, an output signal indicative of the motion of the video capture device is sent from the first motion sensor to a microcontroller or processor at substantially the same time (as indicated by lower horizontal dashed line) that sub-step 214B is carried out, sending an output signal indicative of the motion of the user from the second motion sensor to the microcontroller or processor.

Figure 4:
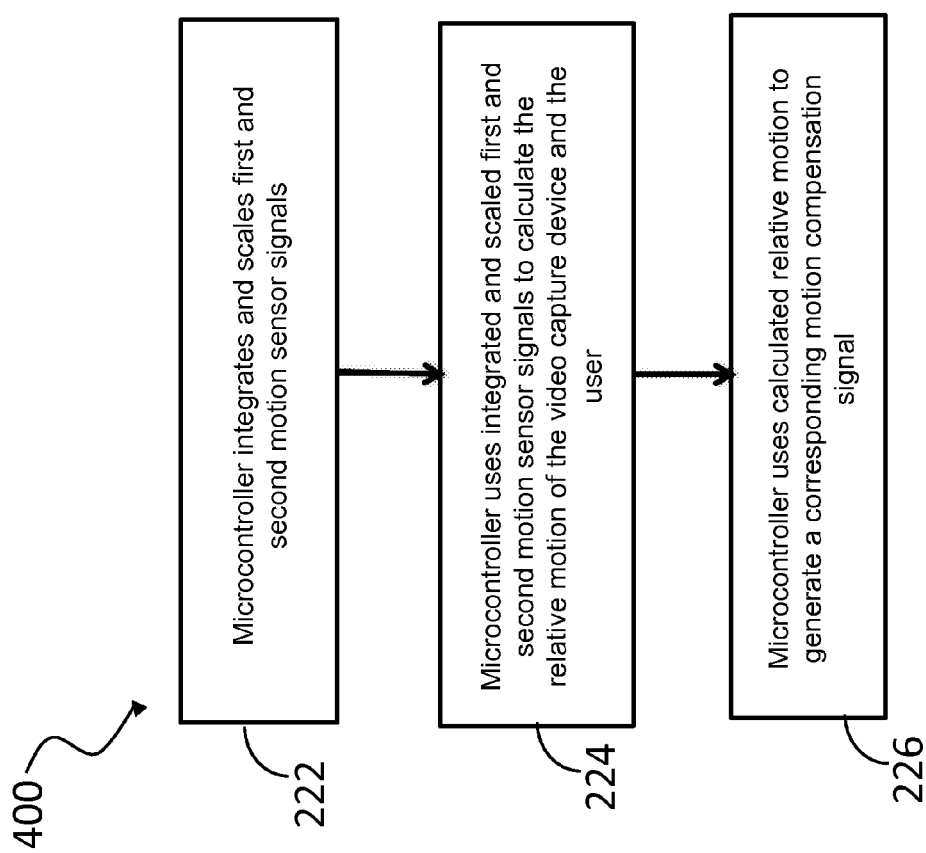
FIG. 4 illustrates sub-steps of a method for in-vehicle optical image stabilization according to one embodiment.

In one embodiment of the present invention, step 220 can be broken down into sub-steps as shown in FIG. 4. At sub-step 222, the output signals received by the microcontroller or processor are integrated and scaled. At sub-step 224, the integrated and scaled signals are compared and used to calculate the relative motion of the video capture device and the user. At sub-step 226, the calculated relative motion is used to generate a corresponding motion compensation signal.

Embodiments described herein provide various benefits. In particular, embodiments provide for the optical stabilization of an image between two frames of reference may be moving relative to each other and independently of each other. Some embodiments allow stabilization of video, of particular value for in-vehicle conference calling. Some embodiments include the use of an algorithm that prevents saturation of motion signals even for large magnitude and high frequency motions, such as may be encountered in moving vehicles.

The above-described embodiments should be considered as examples of the present invention, rather than as limiting the scope of the invention. Various modifications of the above-described embodiments of the present invention will become apparent to those skilled in the art from the foregoing description and accompanying drawings. Accordingly, the present invention is to be limited solely by the scope of the following claims.

The invention claimed is:

1. A system for in-vehicle optical image stabilization, the system comprising:
   a first motion sensor rigidly attached to a video capture device mounted in a vehicle;
   a second motion sensor rigidly attached to an object, other than the video capture device, in the vehicle, the object being within the field of view of the video capture device;
   and
   a controller operatively connected to the first motion sensor, to the second motion sensor, and to a movable lens in the video capture device;
   wherein the object is not attached to or included within the video capture device.

2. The system of claim 1 wherein the first motion sensor provides a first output signal to the controller, the second motion sensor provides a second output signal to the controller; and wherein the controller provides a compensation signal to the movable lens determined by the first and second output signals.

3. The system of claim 2 wherein the movable lens responds to the compensation signal such that an image of the object captured by the video capture device is stabilized in real time.

4. The system of claim 1 wherein at least one of the first motion sensor and the second motion sensor comprises one of the following: a gyroscopic sensor, an accelerometer and a velocimeter.

5. The system of claim 1 wherein the second motion sensor comprises one of the following: a gyroscopic sensor, an accelerometer and a velocimeter.

6. The system of claim 1 wherein the object comprises a face of a person within the vehicle.

7. The system of claim 1 wherein the second motion sensor is worn by a person within the vehicle.

8. The system of claim 1 wherein the movable lens comprises a tracking element comprising one of the following: a liquid lens, a voice coil and a piezoelectric element.

9. The system of claim 8 wherein the tracking element comprises the liquid lens.

10. The system of claim 1 wherein the video capture device is detachably mounted in the vehicle.

11. A method for in-vehicle optical image stabilization, the method comprising:
   receiving a first signal from a first motion sensor rigidly attached to a video capture device mounted in a vehicle;
   receiving a second signal from a second motion sensor rigidly attached to an object, other than the video capture device, in the vehicle, the object being within the field of view of the video capture device; and
   processing the first and second signals to provide a motion compensation signal to a movable lens in the video capture device;
   wherein the object is not attached to or included within the video capture device.

12. The method of claim 11 wherein the movable lens responds to the compensation signal such that an image of the object captured by the video capture device is stabilized in real time.

13. The method of claim 11 wherein at least one of the first motion sensor and the second motion sensor comprises one of the following: a gyroscopic sensor, an accelerometer and a velocimeter.

14. The method of claim 11 wherein the second motion sensor comprises one of the following: a gyroscopic sensor, an accelerometer and a velocimeter.

15. The method of claim 11 wherein the second motion sensor is worn by a person within the vehicle.

16. The method of claim 11 wherein the movable lens comprises a tracking element comprising one of the following: a liquid lens, a voice coil and a piezoelectric element.

17. The method of claim 16 wherein the tracking element comprises the liquid lens.

18. The method of claim 11 wherein the video capture device is detachably mounted in the vehicle.

19. The method of claim 11 wherein the processing comprises calculating a difference between the first and second signals.

20. The method of claim 11 wherein the processing comprises applying an algorithm designed to prevent saturation of at least one of the first and second output signals.

21. The method of claim 20 wherein the processing comprises applying an algorithm employing a high pass filter.

22. The method of claim 20 wherein the algorithm employs a routine which periodically updates a reference position of the corresponding motion sensor while the movable lens is gradually shifted back to the center of its range of motion.

* * * * *